(12) United States Patent
Kemner et al.

(10) Patent No.: US 7,418,072 B2
(45) Date of Patent: Aug. 26, 2008

(54) SPACER

(75) Inventors: Hans Kemner, Herzogenaurach (DE); Günter Bruch, Hirschaid (DE)

(73) Assignee: Areva NP GmbH, Erlangen (DE)

(*) Notice: Subject to any disclaimer, the term of this patent is extended or adjusted under 35 U.S.C. 154(b) by 0 days.

(21) Appl. No.: 11/127,820

(22) Filed: May 12, 2005

(65) Prior Publication Data
US 2006/0056574 A1    Mar. 16, 2006

Related U.S. Application Data

(63) Continuation of application No. PCT/EP2004/001515, filed on Feb. 18, 2004.

(30) Foreign Application Priority Data
Mar. 6, 2003    (DE)    ................. 103 09 742

(51) Int. Cl.
*G21C 3/34*    (2006.01)
(52) U.S. Cl. ................. 376/438; 376/462; 376/434; 376/435; 376/448; 376/461
(58) Field of Classification Search ................. 376/178, 376/434, 435, 436, 438, 448, 449, 461, 462
See application file for complete search history.

(56) References Cited

U.S. PATENT DOCUMENTS

| | | | | |
|---|---|---|---|---|
| 3,281,327 A | | 10/1966 | Webb et al. | 376/439 |
| 4,306,937 A | * | 12/1981 | Hensolt et al. | 376/442 |
| 4,726,926 A | * | 2/1988 | Patterson et al. | 376/439 |
| 5,925,657 A | * | 7/1999 | Seed et al. | 514/369 |
| 6,236,702 B1 | * | 5/2001 | Chun et al. | 376/439 |
| 6,278,759 B1 | * | 8/2001 | Yoon et al. | 376/462 |
| 6,320,925 B1 | * | 11/2001 | Manzel et al. | 376/438 |
| 6,650,723 B1 | * | 11/2003 | Kang et al. | 376/439 |
| 6,912,264 B2 | * | 6/2005 | Meier et al. | 376/439 |
| 2004/0196954 A1 | | 10/2004 | Stabel-Weinheimer et al. | 376/438 |

FOREIGN PATENT DOCUMENTS

| | | |
|---|---|---|
| EP | 0 237 064 A2 | 9/1987 |
| KR | 102002074606 A | 10/2002 |
| WO | WO 02/059903 A1 | 8/2002 |

\* cited by examiner

*Primary Examiner*—Rick Palabrica
(74) *Attorney, Agent, or Firm*—Laurence A. Greenberg; Werner H. Stemer; Ralph E. Locher

(57) ABSTRACT

A spacer for a fuel assembly for a light water nuclear reactor contains a plurality of intercrossed segments, which form a grid. The segments are formed from first and second metal strips which are assembled and provided with protruding parts or corrugations in such a way that the adjacent protruding parts are embodied in such a way that a flow component perpendicular to a vertical central plane which extends between the metal strips is applied to cold water running out from the flow sub-channel.

9 Claims, 4 Drawing Sheets

SPACER

CROSS-REFERENCE TO RELATED APPLICATION

This is a continuing application, under 35 U.S.C. § 120, of copending international application No. PCT/EP2004/001515, filed Feb. 18, 2004, which designated the United States; this application also claims the priority, under 35 U.S.C. § 119, of German patent application No. 103 09 742.2, filed Mar. 6, 2003; the prior applications are herewith incorporated by reference in their entirety.

BACKGROUND OF THE INVENTION

Field of the Invention

The invention relates to a spacer for a fuel assembly of a nuclear reactor cooled by light water, as is disclosed, for example, in published European patent application EP 0 237 064 A2 (corresponding to U.S. Pat. No. 4,726,926).

The known spacer is constructed from a multiplicity of crisscrossing webs that form a grid with a multiplicity of meshes. Each web is formed by two thin sheet-metal strips welded to one another. The sheet-metal strips are provided in each case with raised corrugations that extend into the interior of the grid mesh bounded in each case by the sheet-metal strip. Neighboring corrugations, respectively opposite one another, of the sheet-metal strips assembled to form a web form an approximately tubular flow sub-channel extending in a vertical direction. The flow sub-channels are inclined relative to the vertical and produce a flow component of the cooling liquid that is oriented parallel to the web and directed to a crossing point of the webs. The component produces a swirl flow around the fuel rods respectively penetrating the meshes.

In the case of the known spacer, these corrugations serve at the same time, moreover, as a bearing for the fuel rods penetrating the meshes. The fuel rod bearing has proved to be particularly advantageous in practice, since only slight fretting defects are observed on the fuel cans when use is made of such spacers.

SUMMARY OF THE INVENTION

It is accordingly an object of the invention to provide a spacer that overcomes the above-mentioned disadvantages of the prior art devices of this general type, which simultaneously exhibits improved thermohydraulic properties in conjunction with a high level of resistance to fretting.

With the foregoing and other objects in view there is provided, in accordance with the invention, a spacer for a fuel assembly of a nuclear reactor cooled by light water. The spacer contains a multiplicity of crisscrossing webs forming a grid. Each of the webs are formed of interconnected first and second sheet-metal strips having corrugations such that in each case neighboring corrugations form a flow sub-channel running oblique to a vertical. The neighboring corrugations impart to cooling water emerging from the flow sub-channel a flow component perpendicular to a vertical middle plane running between the sheet-metal strips.

Such a spacer for a fuel assembly of a nuclear reactor cooled by light water is constructed from a multiplicity of crisscrossing webs that form a grid and respectively are formed of interconnected first and second sheet-metal strips. The sheet-metal strips have corrugations in such a way that in each case neighboring corrugations form a flow sub-channel and are fashioned in such a way that they impart to the cooling water emerging from the flow sub-channel a flow component perpendicular to a vertical middle plane running between the sheet-metal strips. An improved lateral mixing of the cooling water is rendered possible thereby.

In particular, the cross section of the partial channel formed by a first corrugation decreases in the flow direction of the cooling water, and the cross section of the partial channel formed by a second, neighboring corrugation increases in this direction. In other words, the cross section of the partial channel formed by the first corrugation is greater at the inlet opening than at the outlet opening, and the cross section of the partial channel formed by the second corrugation is smaller at the inlet opening than at the outlet opening. This increase or decrease in the cross section can be affected continuously over the entire web height. However, forms of corrugation in which a middle region of constant cross section is present are also known. Owing to the mutually differing fashioning of the respectively neighboring corrugations, it is possible to produce a flow component directed perpendicular to the web plane by shaping the sheet-metal strips in a particularly simple way as regards production engineering.

In a further advantageous refinement of the invention, the first and the second sheet-metal strips in each case have first and second corrugations that are alternately disposed in the longitudinal direction of the first and second sheet-metal strips. The first and second sheet-metal strips are assembled to form the web in such a way that each flow sub-channel is formed by a first and second corrugation. Such a sheet-metal strip and the spacer formed by it are easy to fabricate.

In a preferred refinement of the invention, the flow sub-channel runs oblique, or at an inclination, to the vertical at least at its downstream end.

In a further preferred embodiment, the cooling water, respectively emerging from the flow sub-channel of a web, which are mutually neighboring and inclined to a crossing point of two webs, has mutually opposed flow components perpendicular to the middle plane such that a swirl flow is produced around the crossing point, in which case, in particular, the swirl flows around mutually neighboring crossing points are respectively directed in an opposed fashion along a web. This prevents the occurrence of an overall torque produced by the swirl flows and acting on the entire fuel element.

Other features which are considered as characteristic for the invention are set forth in the appended claims.

Although the invention is illustrated and described herein as embodied in a spacer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
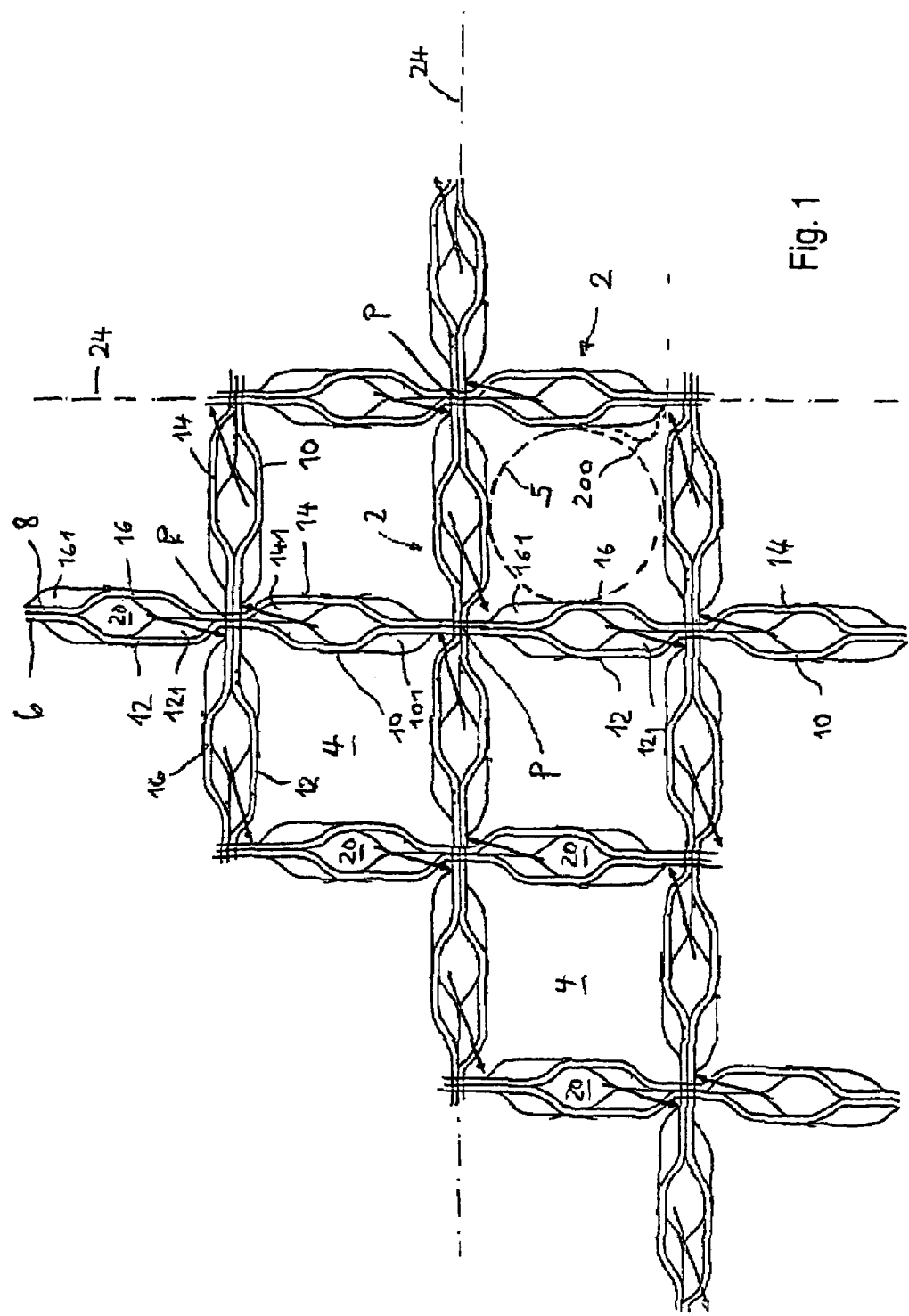
FIG. 1 is a diagrammatic, plan view of a detail from a spacer in accordance with the invention.
Figure 2:
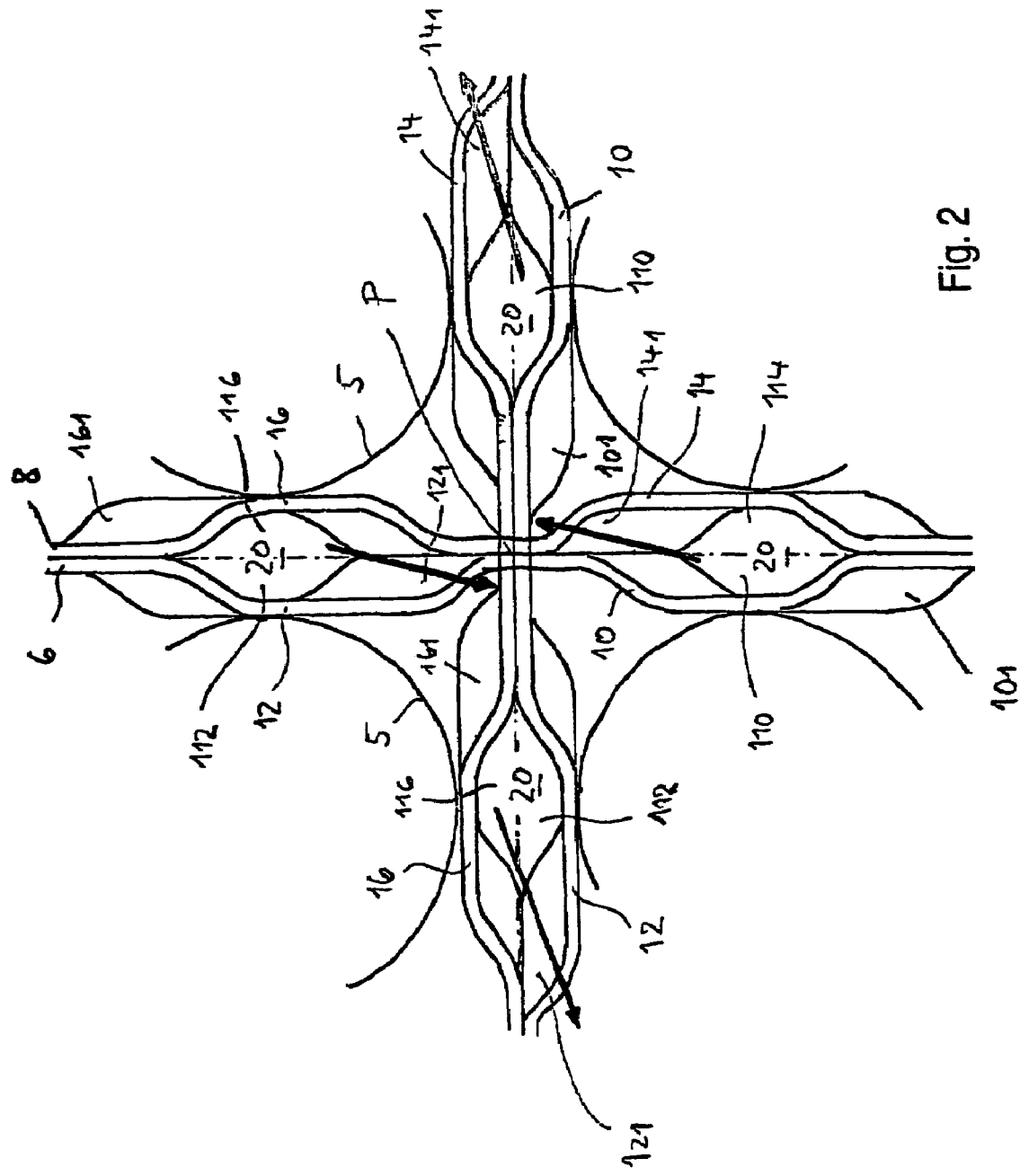
FIG. 2 is an enlarged detailed plan view of the spacer in the region of a crossing point of two webs.

Referring now to the figures of the drawing in detail and first, particularly, to FIGS. 1 and 2 thereof, there is shown a spacer that is constructed from a multiplicity of crisscrossing webs 2 that form a grid with polygonal meshes 4, square ones in the exemplary embodiment, through which fuel rods 5 are guided. Each web 2 is assembled from a first and second sheet-metal strip 6 and 8, respectively, that are welded to one another at their mutually touching upper and lower longitudinal edges.

The first and second sheet-metal strips 6 and 8, respectively, are provided in each case with corrugations 10, 12 and 14, 16, respectively, that extend in each case into an interior of the mesh 4 respectively bounded by the sheet-metal strips 6 and 8. The corrugations 10, 12, 14, 16 serve simultaneously as bearings for the fuel rods 5 penetrating the meshes 4. In this way, there is formed between the corrugations 10, 14 and 12, 16 of the first and second sheet-metal strips 6, 8 respectively forming a web 2, a flow sub-channel 20 in which cooling water flows upward in a vertical direction through the spacer (out of the plane of the drawing).

It is to be seen in FIGS. 1 and 2 that over their entire length in the web plane the flow sub-channels 20 are inclined to the vertical, that is to say inclined to a direction that runs perpendicular to the plane of the drawing. This inclination effects a deflection of the flow inclined to the vertical, but still parallel to the web plane, as before. Respectively neighboring flow sub-channels 20 of a web 2 have an opposing inclination. The four flow sub-channels 20 neighboring a crossing point P are oriented in this case such that two flow sub-channels 20 disposed in a common web 2 are inclined toward one another, while the two flow sub-channels 20 belonging to the other web 2 are inclined away from one another.

Each flow sub-channel 20 has a shape that is asymmetric in relation to a middle plane 24 located between the sheet-metal strips 6, 8 and oriented perpendicular to the plane of the drawing. The corrugations 10, 16 are provided for this purpose in each case with a lower convex arch 101 and 161, respectively, such that at this location the corrugation 10 or 16 lies closer to the crossing point P. The corrugations 14 and 16 assigned respectively to the corrugations 10 and 12 therefore have upper convex arches 121 and 141, respectively, in their upper region, and so the cross-sectional area of the flow sub-channel 20 remains approximately the same over the entire height of the web 2.

Because of the convex arches 101 and 161, respectively, at the inlet of the flow sub-channel 20, the partial channel 110 or 116 respectively formed by the corrugations 10, 16 has a larger cross-sectional area than the partial channel 112 or 114 respectively formed by the corrugations 12, 14. The partial channels 110, 116 therefore branch off a larger quantity of cooling water from the main channel formed by the mesh 4 than do the partial channels 112, 114. Since the cross sections of the partial channels 110, 116 narrow in the flow direction, and the cross sections of the partial channels 112, 114 widen, the cooling water flowing in the flow sub-channel 20 is displaced to the partial channels 112 and 114 and in this way acquires a flow component perpendicular to the web or middle plane 24.

In other words, the asymmetric shaping of the corrugations 10, 14 and 12, 16, that is to say the offset configuration of the convex arches 101, 121, 141, 161, additionally lends the cooling water flowing between the corrugations 10, 14 and 12, 16 a velocity component perpendicular to the middle plane 24 of the web 2, since the cooling water experiences a deflection toward the convex arch 121 or 141.

Figure 3:
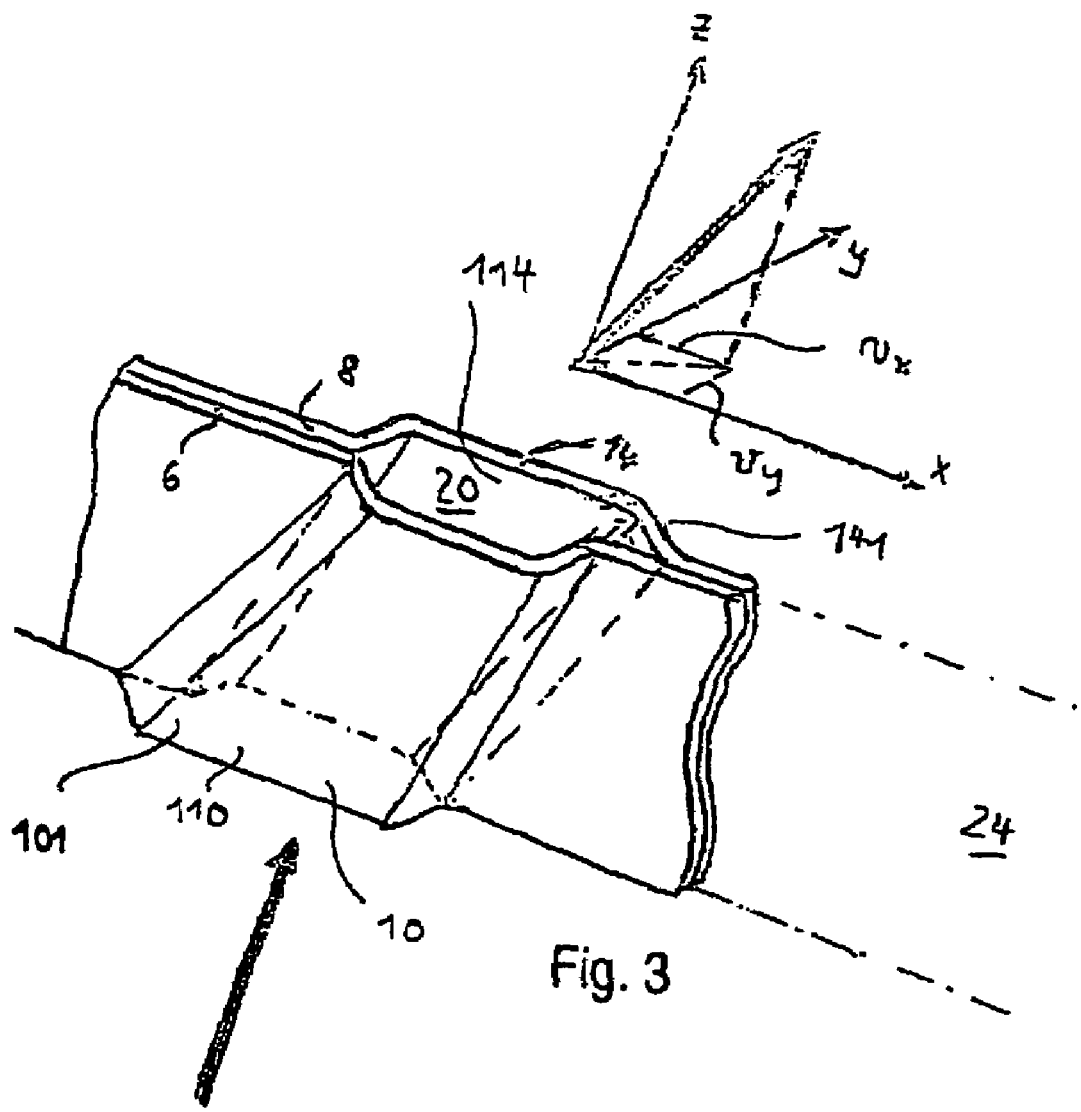
FIG. 3 is a perspective view of a detail of a web in the region of a corrugation.

As an alternative to the configuration of the corrugations that is illustrated in FIGS. 1 to 3 and in the case of which the convex arches form an enlargement of the corrugation only in a direction of the middle plane 24 (web plane), it is also possible to provide convex arches that extend more deeply into the interior of the mesh 4, as is indicated by dashes, with the aid of a convex arch 200, in the right-hand lower mesh of FIG. 1, and to make better use of the space present in the corners and left free by the fuel rod 5.

The effect of the convex arches 121 and 141 is then that, because of the velocity component perpendicular to the longitudinal direction 24, the cooling water flowing out of the flow sub-channel 20 is not directed straight onto the crossing point P but is directed past the latter obliquely. This produces a swirl flow around the crossing point P that leads to an improved heat transfer between the fuel rod and the fluid. Moreover, the corrugations 10, 12, 14, 16 are disposed in such a way that the direction of the swirl flow of respectively neighboring crossing points 22 is opposed. This prevents the torques respectively exerted by the swirl flows from adding up to produce an overall torque acting on the fuel assembly.

In the exemplary embodiment, the corrugations 10, 12, 14, 16 fundamentally have the same shape. First and second sheet-metal strips 6 and 8, respectively, are, however, disposed rotated relative to one another about an axis perpendicular to the plane of the sheet-metal strip or middle plane 24.

The shape of the flow sub-channels 20 in particular emerges clearly from the diagram of FIG. 3. It is clearly to be seen in FIG. 3 that the majority of the cooling water flowing in from below and branched out of the main channels of the flow sub-channel 20 is taken up by the partial channel 110 that is formed by the corrugation 10 that has a lower convex arch 101. Because of the cross-sectional narrowing of the partial channel 110, the cooling water, which flows upward oblique to the vertical (z direction) in the middle plane because of the flow sub-channel 20 running obliquely over its entire length is directed into the partial channel 114 of the neighboring corrugation 14 and thereby acquires, in addition to a velocity component $v_x$ directed toward the crossing point, a velocity component $v_y$ perpendicular thereto.

Figure 4:
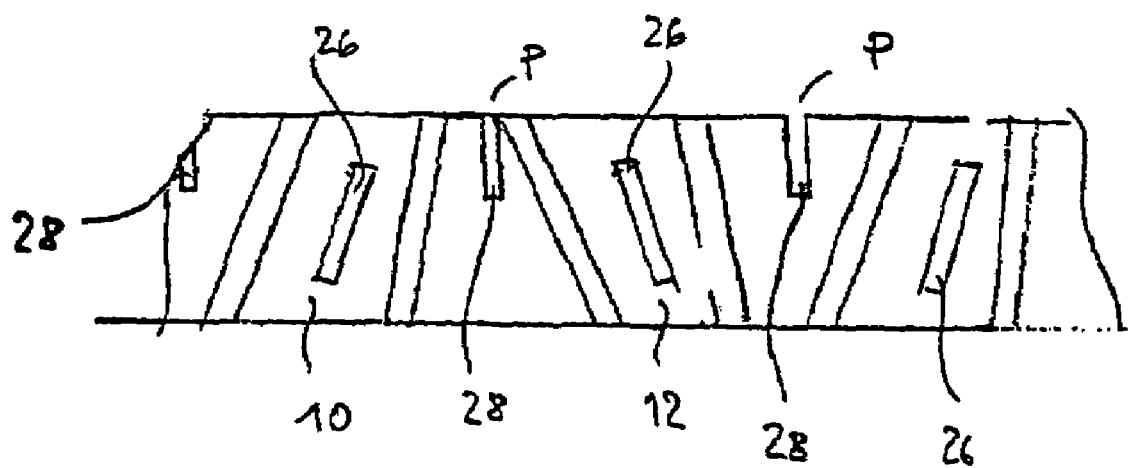
FIG. 4 a side view of a detail of the web.

As is shown in FIG. 4, the corrugations 10, 14 are respectively provided with longitudinal slots 26 in order to improve the mixing of the cooling liquid between the individual main channels, that is to say in order to increase the lateral mass flow.

A further increase in the lateral mass flow can also be achieved by providing windows 28 at the crossing points P. Just as in the case of the known HTP spacer, the corrugations 10, 12, 14, 16 can still have, in the middle of the web 2, elongated convex arches that are on both sides of the slot 26, are orientated into the interior of the mesh 4 and, owing to their shaping, form a linear bearing for the fuel rod such that the latter is held resiliently in the mesh overall on eight lines.

Figure 5:
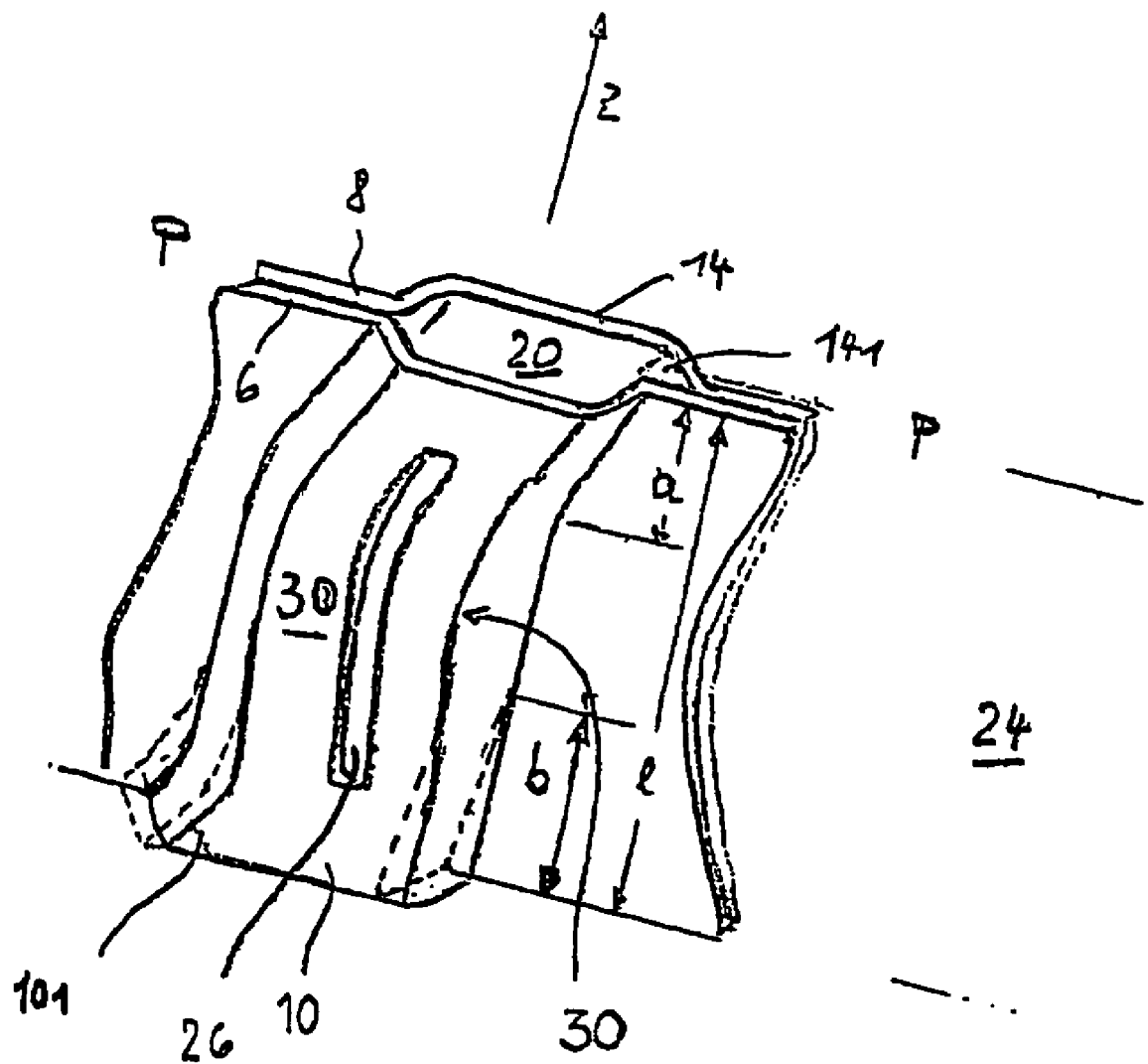
FIG. 5 is a diagrammatic, perspective view of a further refinement of a flow sub-channel according to the invention.

This is indicated in the exemplary embodiment in accordance with FIG. 5. Convex arches 30 are illustrated in this FIG. 5 on both sides of the slot 26. Moreover, in a departure from the exemplary embodiment illustrated in FIG. 3, the flow sub-channel 20 formed by the corrugations 14 and 10 is not inclined to the vertical z over its entire length l (=web height), but only over a part a of its length l at its downstream end and, if appropriate, over a part b of its length l upstream. In the remaining part l-a or l-a-b, the flow sub-channel 20 runs substantially parallel to the vertical z. It is possible in this way, given small mesh widths and large web heights (length l of the flow sub-channel 20), to produce a relatively large velocity component $v_x$ parallel to the web plane 24, that is to say a velocity component directed away from a crossing point P or toward a crossing point P.

This application claims the priority, under 35 U.S.C. § 119, of German patent application No. 103 09 742.2, filed Mar. 6, 2003; the entire disclosure of the prior application is herewith incorporated by reference.

We claim:

1. A spacer for a fuel assembly of a nuclear reactor cooled by light cooling water, comprising:

a multiplicity of crisscrossing webs forming a grid, each of said webs formed of interconnected first and second sheet-metal strips having corrugations shaped asymmetrically in relation to a vertical middle plane running between said sheet-metal strips such that in each case neighboring corrugations form an enclosed flow sub-channel for receiving the cooling water;

said flow sub-channel running oblique to a vertical and having a shape being asymmetric in relation to said vertical middle plane thereby imparting to the cooling water emerging from said flow sub-channel a flow component perpendicular to said vertical middle plane running between said sheet-metal strips; and said asymmetric shape of said enclosed flow sub-channel and said asymmetric shape of said corrugations being predefined.

2. The spacer according to claim 1, wherein said flow sub-channel has a first partial channel with a cross section formed by a first corrugation decreasing in a flow direction of the cooling water, and a second partial channel having a cross section formed by a second, neighboring corrugation increasing in the flow direction.

3. The spacer according to claim 1, wherein:

said first sheet-metal strips have first corrugations alternately disposed in a longitudinal direction of said first sheet-metal strips;

said second sheet-metal strips have second corrugations alternately disposed in a longitudinal direction of said second sheet-metal strips; and said first and second sheet-metal strips are assembled to form said webs such that each said flow sub-channel is formed by said first and second corrugations.

4. The spacer according to claim 1, wherein said flow sub-channel has a downstream end and runs oblique to the vertical at least at said downstream end.

5. The spacer according to claim 4, wherein the cooling water respectively emerging from said flow sub-channels which are mutually neighboring and inclined to a crossing point of two of said webs, have mutually opposed flow components perpendicular to the vertical middle plane such that a swirl flow is produced around said crossing point.

6. The spacer according to claim 5, wherein swirl flows around mutually neighboring crossing points are respectively directed in an opposed fashion to each other along said web.

7. A fuel assembly comprising:

at least one spacer, containing:

a multiplicity of crisscrossing webs forming a grid, each of said webs formed of interconnected first and second sheet-metal strips having corrugations shaped asymmetrically in relation to a vertical middle plane running between said sheet-metal strips such that in each case neighboring corrugations form an enclosed flow sub-channel running oblique to a vertical and having a shape being asymmetric in relation to said vertical middle plane thereby imparting to cooling water emerging from said flow sub-channel a flow component perpendicular to said vertical middle plane running between said sheet-metal strips;

said asymmetric shape of said enclosed flow sub-channel and said asymmetric shape of said corrugations being predefined.

8. The fuel assembly according to claim 7, wherein: said asymmetric shape of said corrugations is formed by predefined offset arches.

9. The spacer according to claim 1, wherein: said asymmetric shape of said corrugations is formed by predefined offset arches.

* * * * *